Figure 1:
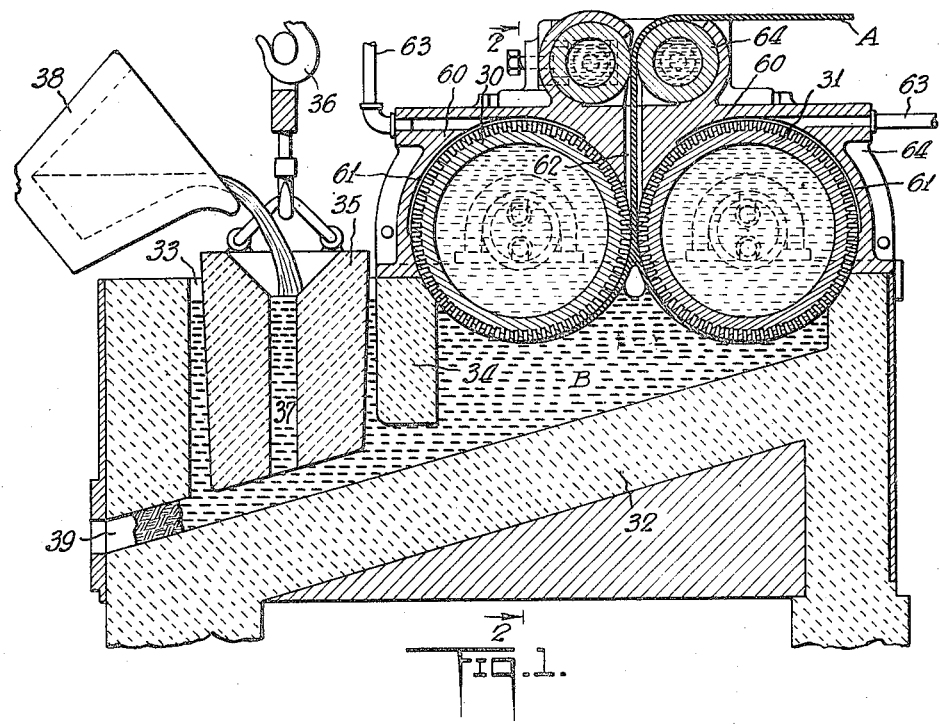

Aug. 29, 1939.  A. SIMONS  2,171,132

METHOD OF FORMING ELEMENTS FROM MOLTEN METAL

Filed June 19, 1937  5 Sheets-Sheet 1

INVENTOR
Aaron Simons
BY
ATTORNEYS

Aug. 29, 1939.    A. SIMONS    2,171,132
METHOD OF FORMING ELEMENTS FROM MOLTEN METAL
Filed June 19, 1937    5 Sheets-Sheet 2
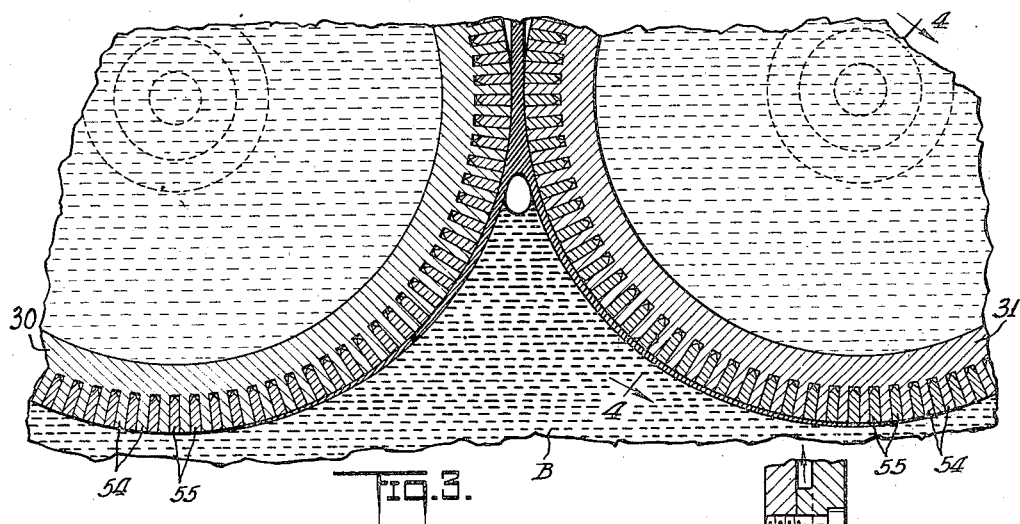
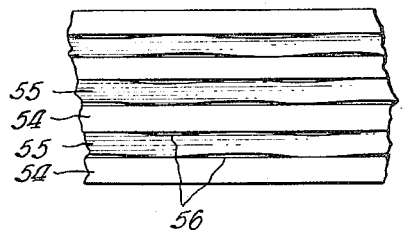
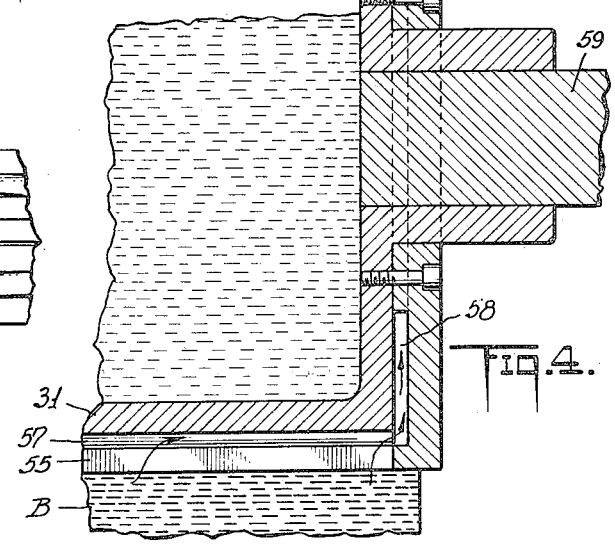
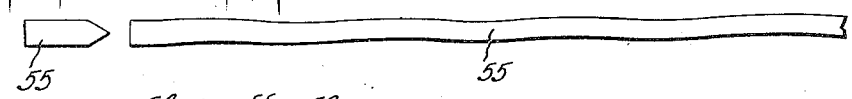
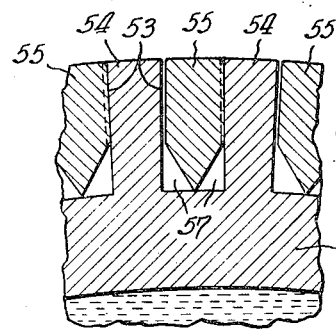
INVENTOR
*Aaron Simons*
BY
ATTORNEYS

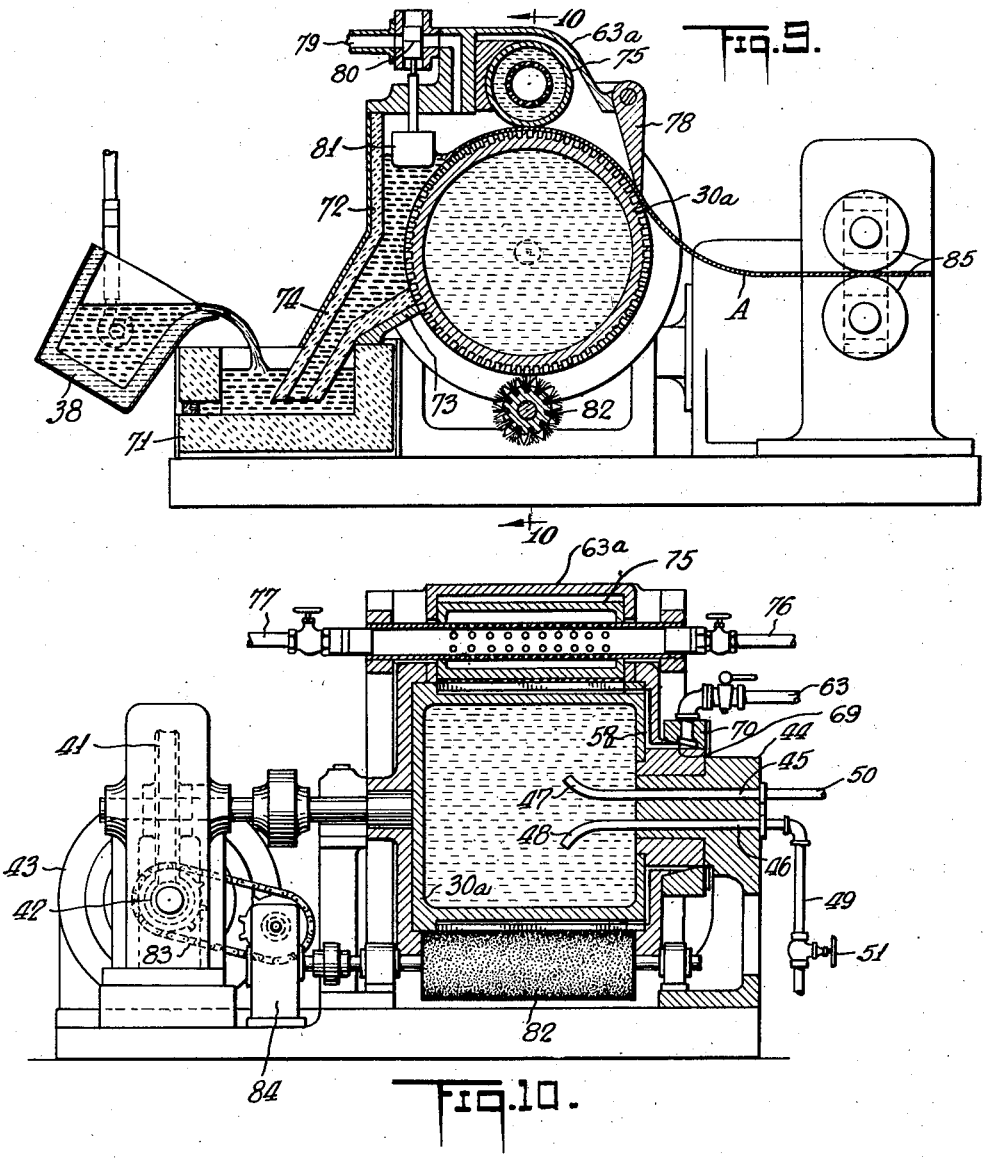

Aug. 29, 1939. A. SIMONS 2,171,132
METHOD OF FORMING ELEMENTS FROM MOLTEN METAL
Filed June 19, 1937 5 Sheets-Sheet 4
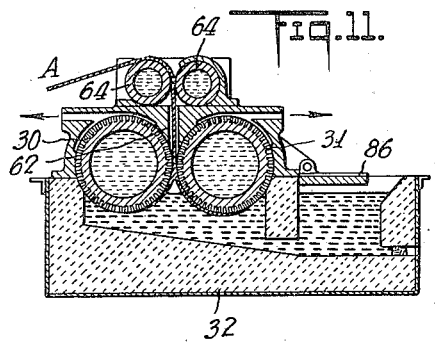
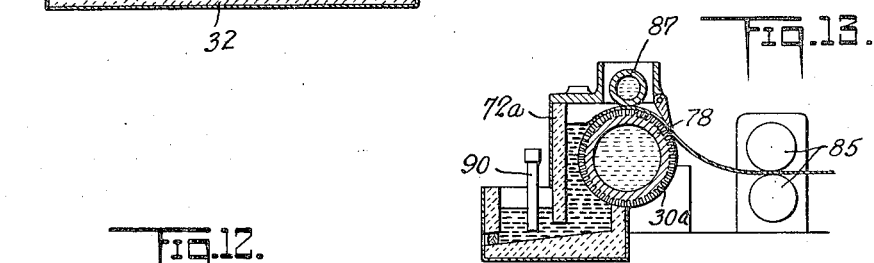
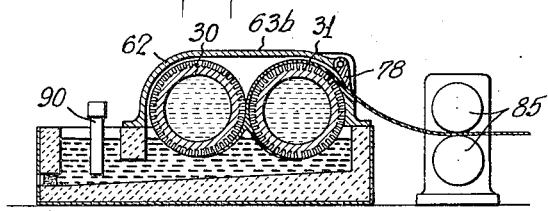
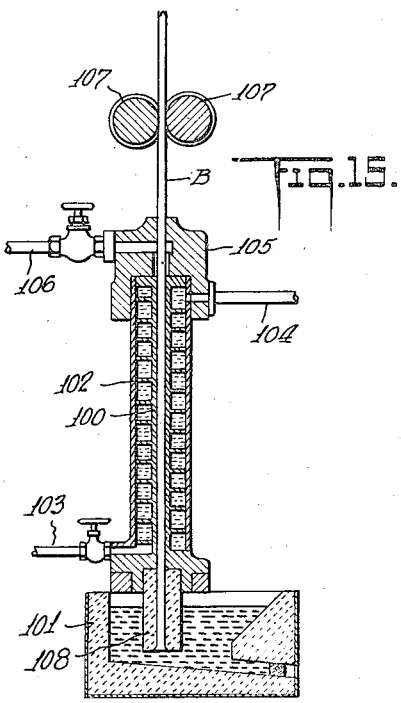
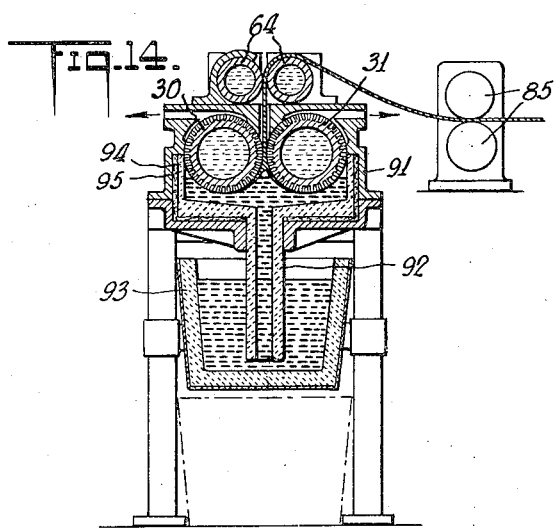
INVENTOR
*Aaron Simons*
BY
ATTORNEYS Aug. 29, 1939.    A. SIMONS    2,171,132
METHOD OF FORMING ELEMENTS FROM MOLTEN METAL
Filed June 19, 1937    5 Sheets-Sheet 5
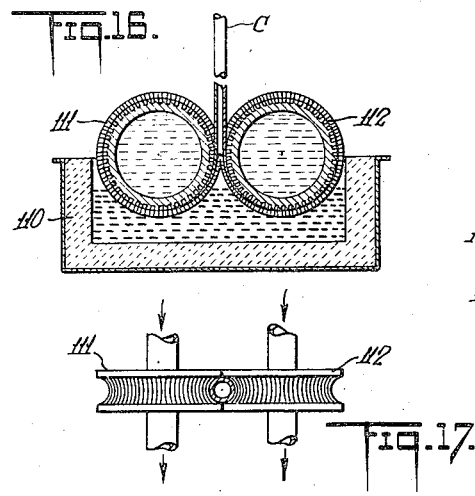
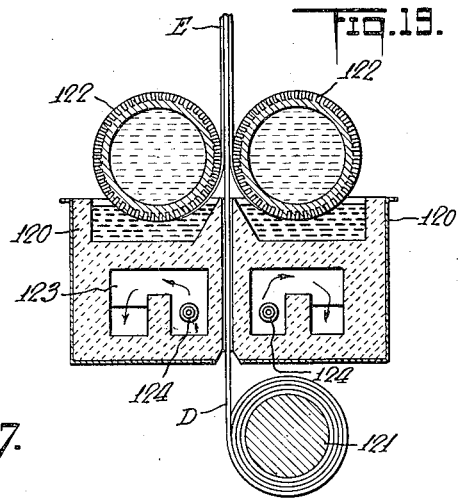
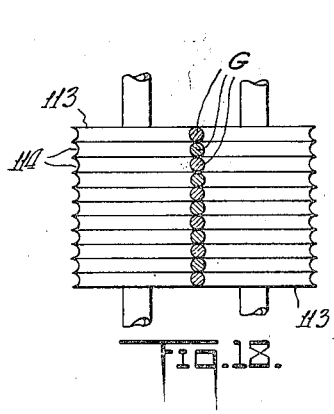
INVENTOR.
Aaron Simons
BY
Dean Fairbank & Hirsch
ATTORNEYS Patented Aug. 29, 1939

2,171,132

UNITED STATES PATENT OFFICE 2,171,132

METHOD OF FORMING ELEMENTS FROM MOLTEN METAL

Aaron Simons, New York, N. Y.

Application June 19, 1937, Serial No. 149,070

6 Claims. (Cl. 22—200.1)

This invention relates to the continuous formation of metal products from heated material, such for example, as molten metal.

The broad principle of the present invention involves the forming of a film or layer of plastic or solid material beneath the surface of a bath of heated material, for example, molten metal, and the continuous carrying of said film or layer above the liquid level to form the desired product.

As an important feature the layer or film is formed on the surface of a chilled roller or drum having minute surface openings and partially immersed in or having its surface exposed to a bath of heated material. Thus as the drum rotates and fresh portions of the exterior surface come into contact with the heated material, a thin layer of the latter is chilled and becomes plastic, and at the same time this thin plastic layer is prevented from slipping from the surface of the drum and clings thereto during the lifting action of said roller or drum.

As a further feature, suction is employed to create a substantial vacuum in the surface openings on the drum or roller to support the metal or material upon the surface of the chilled drum. In accomplishing this result, the suction will exhaust the air or gas from the openings and from between the surface of the drum and the film of plastic metal to cause said film of material to cling to said surface.

The thickness of the film, layer or sheet, varies with the length of time of exposure of the surface of the drum or roller to the heated material. Thus as the surface of the drum first comes in contact with the heated material a very thin plastic film is formed and this progressively increases in thickness until the surface of the drum emerges from the heated material. The heat transfer from the material through the drum is comparatively high as the film is held against the surface by the action of the suction or vacuum, and therefore the portion of the film or layer nearest to the drum surface will be the coldest and the hardest, and the hardness of the film or layer will progressively decrease to the point where it contacts the heated material. The thickness of the film or layer on the drum as it emerges from the material will depend upon the diameter of the drum, the speed of rotation of the drum, and the relative temperatures of the drum surface and the particular material employed. It will also be understood that a comparatively uniform thickness will be provided in the film or layer which is picked up and removed from the material by the action of the drum.

The arrangement of the holes or openings formed throughout the surface of the drum will be such as to provide efficient distribution of the suction over the area of the drum surface so as to accomplish the desired result. It will be apparent that where the surface of the drum is exposed to the material, the suction on said surface is inward or radial, and where the surface of the drum is exposed to the source of the suction, the drum is subjected to an outward suction, which aids in maintaining the surface of the drum free and clear of foreign particles. In some instances I employ a brush contacting the surface of the drum to aid in removing such particles therefrom prior to reentering the bath or body of heated material.

In certain embodiments of the invention I utilize the suction or partial vacuum in conjunction with a float actuated valve for controlling the level of the heated material to be maintained with respect to the roller or drum. It is another feature of the invention to employ two drums or rollers arranged in predetermined spaced relationship to each other so as to produce between adjacent surfaces of each drum and from material picked up and conveyed by each drum, a product of predetermined uniform thickness as it emerges from between said drums or rollers. In some instances, additional rollers may be provided for further processing of the product, for example, to more positively gauge the thickness and uniformity of the resulting product, or if desired, to definitely reduce the thickness thereof. It will be understood in this connection that this further processing is performed while the workpiece, fed from the drums or rollers, is still warm or relatively soft. By using additional forming means which are chilled, a further chilling and hardening of the product can also be produced, so that the product can be both hot rolled and cold rolled after being formed from the molten material.

Where two rollers are used, each of which is picking up and lifting a layer of material from a bath, the surfaces of said layers which are furthest from the surfaces of the rollers will be the hottest, softest and most plastic, and it is these two surfaces which are squeezed and firmly pressed together as the product passes between the two rollers.

Any excess material will be caused to flow back into the bath. These hot plastic surfaces which are brought together have not been exposed to the atmosphere to any appreciable extent, and therefore there has been little or no opportunity for the oxidation of said surfaces, and a perfect weld is produced.

My invention is adaptable for the production of products of various classes, and in the present disclosure of the invention, a number of such adaptations or uses are disclosed to illustrate some examples and adaptations of the invention.

It is a further feature of the invention to provide a container, or so-called bath, of the heated material which is so constructed and arranged that the replenishment of the consumed heated material takes place at a point remote therefrom so that the material in such chamber or bath is not exposed to atmosphere, and further to arrange the drum or drums in connection with the bath so as to expose the same to the bath at a point below the surface of the material, and still further to so construct the container that in the event that solidified particles are formed adjacent the drum or drums and not forming part of the plastic films, the same will drop by gravity to a clean-out arranged at the bottom of the container. This construction eliminates, to a large degree, the oxidation of the material, and renders the method and the apparatus employed more efficient in operation.

In the accompanying drawings various different embodiments of my invention are illustrated and which show certain features of construction and indicate how various different kinds of shaped elements may be produced.

Figure 2:
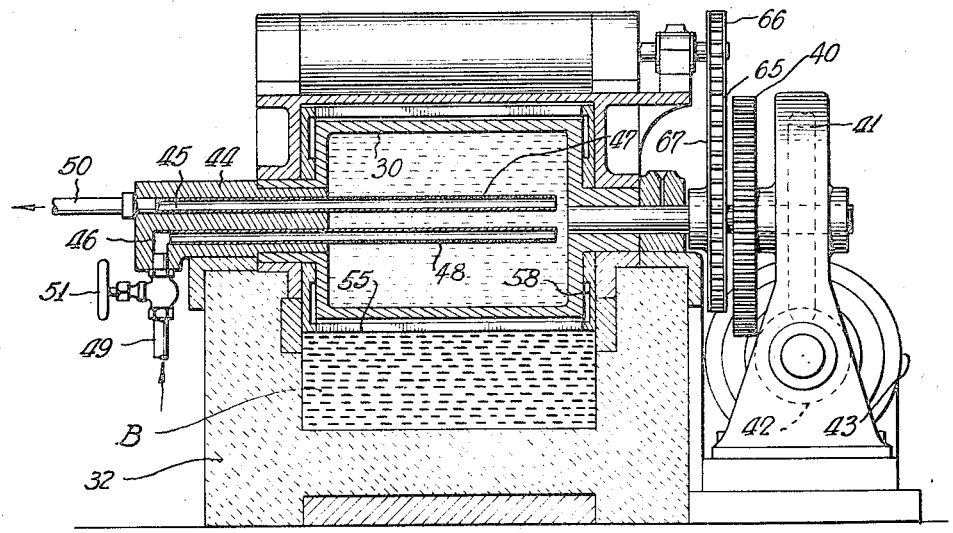

In these drawings:

Fig. 1 is a central vertical section through an apparatus embodying my invention, Fig. 2 is a transverse section on the line 2—2 of Fig. 1, Fig. 3 is a section similar to a portion of Fig. 1, but on a larger scale and showing certain features more in detail, Fig. 4 is a section on the line 4—4 of Fig. 3, Fig. 5 is a face view of a portion of the drum shown in Figs. 3 and 4, Fig. 6 is a face view of one of the aperture defining elements on the surface of the drum, Fig. 7 is an end view of the member shown in Fig. 6, Fig. 8 is a section similar to a portion of Fig. 3, but on a larger scale, Fig. 9 is a section similar to Fig. 1, but showing a different type of construction, Fig. 10 is a section on the line 10—10 of Fig. 9, Figs. 11 to 14 inclusive are vertical sections on a somewhat smaller scale and showing other forms of apparatus for making sheets or strips, Fig. 15 is a vertical section through an apparatus for forming rods, Fig. 16 is a vertical section of an apparatus for forming tubes, Fig. 17 is a top plan view of portions of the construction shown in Fig. 16, Fig. 18 is a view similar to Fig. 17, but showing a construction for simultaneously forming a plurality of wires or rods, Fig. 19 is a vertical section through an apparatus for applying a coating to a previously formed rod, wire, pipe or sheet, and Fig. 20 is a vertical section through an apparatus for forming a sheet or strip of two different metals.

In the specific construction illustrated in Figs. 1 and 2 there is provided a pair of drums 30 and 31 mounted in suitable bearings for rotation in opposite directions about horizontal axes and so positioned in respect to each other that their juxtaposed surfaces are slightly spaced to permit the formed strip or sheet A to pass between them. The two drums may be mounted on the walls of a receptacle 32 for a bath B of heated material, for example molten metal, the liquid level being normally somewhat below the line of approximate tangency of the two drums.

Heated material may be supplied to the receptacle 32 in any suitable manner, as for instance, by pouring into a well 33 spaced from the main body of the bath by a partition 34 which does not extend to the bottom, but which prevents slag, forming on the surface, from floating into contact with the drums. In order that a substantially constant level of the liquid may be readily maintained, independent of variations in the rate of delivery of the heated material to the bath, there may be provided a filler 35 suspended in the well and connected to suitable means 36 whereby it may be raised or lowered as desired. This filler may have a central passage 37 through which the heated material may be poured from a ladle 38.

The bottom wall of the receptacle 32 is preferably inclined and may be provided with a tap hole 39 normally suitably plugged, whereby residual material may be drained from the receptacle at the end of an operation or heavier or solid particles or pieces which may have settled to the bottom of the heated material may be removed. Suitable means may be provided as shown in Figs. 12 and 19, for heating the receptacle or the molten material itself so as to maintain the molten material in a suitably workable condition.

As the drums extend into the bath at the opposite side of the partition 34 from the point where metal is delivered to the bath, it will be noted that any heavy portions in the bath will settle away from the drums and any lighter portions or slag will float to the surface of the heated material in the well without coming in contact with the drums.

Any suitable means may be provided for rotating the two drums. They may have intermeshing gears 40, and the shaft of one of the drums may be provided with a worm wheel 41 meshing with a worm 42 on the shaft of a motor 43.

Suitable means are provided for continuously chilling the drums. As illustrated each drum is hollow and is journaled at one end on a bearing block 44 provided with two passages 45 and 46 extending lengthwise thereof into the interior of the drum. Within the drum these passages may be connected to conduits 47 and 48 arranged for the distribution of the water in the drum. As shown they have perforations along their lengths and facing in opposite directions. Thus cold water may be delivered through a pipe 49 and the passage 46 and conduit 48, and may flow from the drum through the conduit 47 and passages 45 to an outlet pipe 50. The rate of flow of the water, and therefore the cooling effect, may be controlled in any suitable manner, for instance by means of a valve 51 in the pipe 49. Other means might be employed for cooling.

The drums are constructed with a perforated periphery so that suction may be applied through the perforations to the bath of heated material at its contact with the drums.

The peripheral surface of the drum is provided with a series of longitudinal slots 53 separated by flanges 54. The sides of the slots 53 may be substantially parallel and in each slot there is mounted a bar 55 which is slightly narrower than the width of the slot and slightly waved as shown in Fig. 5 so that when inserted in the slot it engages opposite sides of the slot and provides a series of very narrow apertures spaced apart lengthwise and along opposite sides and at alternate points along the length and constituting passages or perforations 56 leading from the surface of the drum to the base or innermost portion of the slots or grooves.

The bars 55 are of such depth that their outer surfaces lie substantially flush with the outer surfaces of the flanges 54, but the inner portion of each bar is tapered as shown particularly in Figs. 7 and 8 so that longitudinal passages 57 are formed lengthwise of the inner portion of each slot. The slots 53 and the bars 55 are of a length slightly less than the length of the drum, and each groove 57 communicates at either one or both ends with an annular passage 58 in the end wall of the drum. The shaft of one of the drums, namely the drum 31, is indicated at 59 in Fig. 4 of the drawings, and upon this shaft one of the gears 40 is arranged.

The drums are covered by a casing 60 rigidly affixed to the receptacle 32 and its partition 34. A portion of the casing 60 as well as a portion of the wall of the receptacle 32 and a portion of the partition 34 serve as substantially air-tight bearings for the drum, but a substantial section of the casing 60 is recessed to form a chamber 61 between the casing and the periphery of the drum. Through the central portion of the casing 60 and in line with the approximate point of tangency of the drums is a slot 62 for the passage of the metal product to be formed between the drums. The chambers 61 are connected through conduits 63 to a suitable means for creating the suction or partial vacuum, so as to create the desired suction effect. In acting upon the lower portions of the drum in contact with the molten bath, the suction will act to draw the air from the openings 56 through the passages 57 and thus into the annular passages 58. Thus a substantial vacuum will be created upon the surface of the drum where submerged in the bath and at points above the bath except where exposed or to the chambers 61. This last described suction may be said to be inward with respect to the surface of the drum.

This suction is essential for the purpose of lifting the plastic film out of the molten bath. Where the heated material comes in contact with the relatively cold drum, a film of partly cooled plastic material will be formed. Ordinarily this fairly hot plastic material will not adhere to the relatively cold metal of the drum, and therefore the cold drums would be unable to lift the film of plastic material from the bath to form a product. The suction removes substantially all air and gas lodging between the drum and the plastic film and causes this film of plastic material to cling to the drum. As the drum rotates additional amounts of the heated material, in contact with the cooled film, will become plastic by the cooling action of the drum, and will adhere to the film and increase its thickness. The thickness of the eventual films may be controlled by the amount of the surface of the drums exposed to the heated material, and the size and speed of rotation of the drums or length of time of the exposure.

If heated material is cast in a non-porous mold, gas and air bubbles will lodge between the mold and the casting, causing the casting to become pock marked. The suction exerted on the bath of heated material through the apertures in the drums will serve the further purpose of removing all bubbles of gas and air, so that the surface of the film of plastic material clinging to the drum will be smooth and free of pock marks. The apertures on the periphery of the drums should be sufficiently close together to cause the film to cling by the action of the suction and to remove all gas and air bubbles. At the same time the apertures should be sufficiently small to prevent the entrance of any of the heated material.

As the drums rotate and leave the bath of heated material, they will carry the clinging films of plastic material. These films are coolest at their surface in contact with the drums, and hottest at their outermost surface with respect to the drums. As the two films pass through the narrow space at the point of approximate tangency of the drums, the two hot surfaces of the films will be brought together, and the pressure at that point will force the two films to adhere or weld together, causing them to pull each other away from the suction exerted by the apertures in the periphery of the drums, and the finished or welded product will rise through the passage 62. Furthermore the edges of the casing 60 coming in contact with the surfaces of the drums, serve to release the finished product and guide it into the passage 62.

In the above described operation it will be understood that the hardest portion of each layer or film is that which is in direct contact with the surface of the drums. The other surfaces are softer and hotter and these two surfaces are brought together and squeezed or pressed between the two drums and are substantially welded in this operation, so as to form a unitary sheet, and this sheet extends upwardly through the passage 62. As shown in Fig. 1 this strip or sheet of still fairly hot solid material passes between a pair of rollers 64 mounted in bearings on the casing members 60 and rotated in opposite directions in any suitable manner, for instance, by chains 65 and sprockets 66 and 67 from their respective drums. One of the rollers 64 may be adjustable toward the other by means as indicated at 64a, Fig. 1, to vary the spacing, and the surface speed may be the same as that of the drums or may be faster depending upon whether it is desired to reduce the thickness of the strip or sheet.

In some cases no suction need be employed and the adherence of the material to the drum surface is effected solely by the surface irregularities produced by the ends of the apertures 56 which may be slightly flared, and by the escape of the imprisoned gas or air through said apertures 56 and the passages 57 and 58 and the chambers 61 and the conduits 63 to the outside atmosphere without connecting said conduits 63 to a means for creating suction or partial vacuum.

The liquid level between the two drums may be substantially below the point of tangency of the drums. The layers of metal formed on the drum surfaces will, as previously pointed out, be the hardest on the side contacting with the drum, and will be relatively soft and plastic on the other side. Thus as the two layers come together any excess material may be squeezed down or caused to flow back into the bath, but practically no air will come in contact with the surface of the material between the two drums because of their substantially air-tight housing in the casing 60 and the wall 32 and partition 34 of the receptacle.

By forming the surfaces of the drums as above described, it will be noted that the bars 55 may be readily removed from the grooves in case they become clogged or material solidifies in the passages 56. By slightly waving the bars 55 the passages or slots 56 through which the suction is applied to the material, are very narrow and may be comparatively long so that an adequate suction effect may be brought to bear, and the removal of the bars 55 permits the complete and ready cleaning of the apertures. The bars 55 may also be made of a porous refractory material so as to permit the action of the suction directly through them without requiring the specific apertures 57.

Although it is preferable to employ a pair of drums both extending into the bath as in the form above described, I may in some instances employ only a single drum contacting with the heated material. Such an arrangement is shown in Figs. 9 and 10. The drum 30a may be provided with the same type of cooling means, the same type of rotating means and the same general type of suction applying means as in the form above described. Further with this construction it will appear that the annular passage 58 is disposed at one side only of the drum and is exposed to all of the openings in the surface of the drum similar to those employed in the structure shown in Figs. 1 to 8 inclusive.

As illustrated in Fig. 10 the connections to the source of suction are at the same end of the drum as the cooling water connection and opposite to the end carrying the drive. In this figure the vacuum conduit 63 is connected to a collar 70 encircling the hub of the drum, and the passage 58 is in the housing and not in the drum and connects at the joint 69 with the conduit 63. This passage 58 need not extend completely around the hub, but may extend only along a section corresponding to the portion of the annular path of the periphery of the drum which is in contact with the molten material and the formed strip A, and which requires the action of the suction.

Instead of having the drum mounted above the surface of the bath and dipping into the bath, it is so mounted and the casing is so designed that the material is drawn up from the bath by the action of a vacuum. As shown a body of heated material, for example, molten metal, is maintained in a reservoir 71 and at the desired level which may be entirely below the lower side of the drum. Heated maerial may be supplied to this bath continuously or intermittently, for instance by a ladle 38.

Mounted at one side of the drum 30a is a casing 72 having a wall 73 engaging the side of the drum and having a conduit portion 74 extending down into the material in the receptacle 71. Above the drum 30a there is mounted a roller 75 which may be chilled in any suitable manner, for instance by internal water circulation, the shaft of the roller being hollow and connected to supply and exhaust conduits 76 and 77 at opposite ends. This roller is vertically adjustable and normally presses down onto the layer of material which is formed on and carried over the roller 30a.

The casing 72 is closed at the top by a casing member 63a which encircles the roller 75 and has a movable baffle or closure 78, the free edge of which presses toward the periphery of the drum 30a, but permits the sheet or strip to pass out between the two. The air is exhausted from the upper portion of the chamber formed by the casing 72 and the drum 30a. As shown there is a vacuum pipe 79 provided with a valve 80 which may be controlled by a float 81 in the chamber so that when the vacuum has sucked the material up to the desired level to cover the desired portion of the periphery of the drum, it may be held substantially at that level.

Outside of the casing 72 and beneath the drum 30a there is provided a rotary brush 82 for removing from the surface of the drum any particles of material which may adhere thereto.

The drum may be rotated in any suitable manner, as for instance by means of a motor 43 having a worm 42 engaging a worm wheel 41 on the shaft of the drum. The brush may be driven by pulleys or sprockets and chain 83 and reduction gearing 84.

In the operation of the apparatus shown in Figs. 9 and 10 the vacuum applied through the pipe 79 lifts the heated material up from the receptacle 71 to cover a portion of the surface of the drum, and the suction through the apertures in the surface of the drum exposed to the molten metal will cause a film or layer of material, chilled by the drum, to cling to the surface of the latter and be carried up and beneath the roller 75. The latter compacts the layer and reduces it to the desired uniform thickness as well as chilling the upper and outer surface of the film of material, and the resulting strip or sheet passes from the apparatus between the closure member 78 and the surface of the drum. This strip or sheet may be further reduced in thickness if desired by means of any desired number of pairs of rollers, one such pair 85 being illustrated in Fig. 9.

Various other designs and arrangements of parts may be employed for carrying out my invention. For the making of sheets or strips I have illustrated somewhat diagrammatically several forms in Figs. 11 to 14 inclusive.

The construction illustrated in Fig. 11 is the same in principle as that shown in Fig. 1, except that in Fig. 11 the parts 35 and 36 are omitted, and the well 33 is provided with a cover 86 which may be lifted to permit material to be poured in.

In Fig. 12 there is shown a construction somewhat similar to that shown in Fig. 11 except that provision is made for maintaining the material at the desired temperature in the bath. As illustrated electrodes 90 extend into the receptacle. The upper rollers 64 are omitted and a single casing member 63b extends over both drums, and a movable narrow closure member 78 is shown similar to that in Fig. 9.

In Fig. 13 there is shown a construction similar to that shown in Fig. 9 except that the wall 72a is vertical, the bath is partly beneath the drum and electric heating means 90 is provided. In this construction there is provided an adjustable internally cooled roller 87 corresponding to the roller 75 of Fig. 9.

In Fig. 14 the two drums as shown in Fig. 1 are mounted so as to dip into a receptacle 91 having a conduit 92 leading from the bottom thereof downwardly into a supply receptacle 93 which may be in the form of a removable and portable ladle and which is vertically adjustable on standards so that when the ladle is placed in position it may be lifted up to cause the lower end of the conduit 92 to be immersed to the desired depth in the material. The suction applied through the pores or apertures on the surfaces of the two drums 30 and 31 causes the heated material to be sucked up from the receptacle 93 and maintained at the desired level in the receptacle 91.

The receptacle is shown as lined with refractory material 94 which may be spaced from the outer wall by insulating material 95, such as asbestos. This type of wall may be employed in all of the other forms.

In Fig. 15 there is shown a different type of apparatus whereby the heated material may be sucked up into contact with the chilling surfaces, but without drums. In this construction the apparatus is designed for making rods rather than sheets or strips. A vertical tubular casing 100 is mounted above a heated material, such for example as molten metal in a receptacle 101, and the casing 100 has an internal bore or chamber of the diameter desired for the rod to be formed. This casing has a water jacket 102 preferably with a helical guide so that water may be delivered at the lower end through a pipe 103 and withdrawn at the upper end through a pipe 104 and caused to circulate around the casing 100. At the upper end of the casing is a header 105 connected by a pipe 106 to a source of suction, and at the top of the header is an opening making a close fit with the rod B which is to be formed. Above the header is a pair of rollers 107 grooved to engage with the rod and pull it upwardly. Below the casing there is an extension 108, preferably of refractory material extending down into the bath.

In starting the apparatus in operation a metal rod of the desired diameter and having a loose fit in the bore is extended down between the rollers 107 and through the header 105 to a point somewhat above the level of the heated material in the receptacle 101, and suction or partial vacuum is applied through the pipe 106. It will be understood in connection with the structure disclosed in Fig. 15 that as the material rises in the passage of the casing 100, the chilling of the heated material causes this material to shrink, thus the suction through the pipe 106 will be exposed to the clearance formed by this shrinkage of the material to aid in lifting the product through the casing passage. Thereafter, the product formed is pulled up by the rollers 107. The formation of the product, which may be for example a rod, from the bath results in a successive series of hardness of the heated material or different degrees of solidification due to the chilling action upon the product or workpiece. It will be understood that the level of the heated material is maintained above the lower end of the conduit 108.

To insure uniform operations, the liquid level in the receptacle 101 should be maintained substantially constant, and the suction likewise maintained substantially constant, and of such subatmospheric pressure as to raise the heated material up to the point at which it cools sufficiently to become a solid rod. Here as in the other forms above described, the slag or other impurities floating to the top of the material into the bath will not enter the conduit to form the rod, and likewise portions of the material which may solidify will settle to the bottom of the bath and will be prevented from being pulled up by the suction and will not be incorporated in the rod.

The broad principle involved in the present invention may be employed for forming a pair of curved metal strips and welding them together to form a continuous tube. In Figs. 16 and 17 there is shown a receptacle 110 for the heated material, and a pair of drums 111, 112 which have a semi-circular groove in the periphery. The drums may be cooled by the circulation of water therein the same as in all of the forms previously described, and the surfaces of the grooves but not the surfaces of the flanges at the sides of the grooves are provided with apertures or openings, whereby the suction may be applied to the curved surfaces. To simplify the illustration, the cooling means, the suction applying means and the upper casing members have not been incorporated in these figures, but obviously would be employed. As the drums rotate in opposite directions the material will form curved strips as films or layers within the grooves. As the two substantially semi-cylindrical strips pass between the two drums their edges will be pressed and welded together so that there is produced a continuous tube C.

In Fig. 18 there is shown a somewhat similar arrangement, but for forming a plurality of wires or rods. Here each internally cooled drum 113 has a plurality of annular substantially semi-cylindrical grooves 114 in the periphery thereof, and the surfaces of the grooves are provided with apertures (not shown) for the application of a suction to the material contacting with said grooves as the lower portions of the drums move into and out of the heated material bath. As a result there is formed a plurality of parallel wires or rods G. With this form of construction it will be apparent that the drums 113 will operate substantially in the manner illustrated in Figs. 1 and 2. However, by moving at a high rate of speed, it will be apparent that a thin film may be formed in each of the grooves 114 so that the resulting products would be tubes rather than rods in accordance with the teachings in Figs. 16 and 17.

In Fig. 19 there is shown a form of apparatus for the application of layers or films of heated material to opposite sides of previously formed sheets or strips of suitable material. Here there are provided two receptacles 120 with a passage between them for a sheet or strip D which may be taken from a reel 121 and passed upwardly between a pair of drums 122. These are internally cooled and provided with suction or partial vacuum apertures and connections as in the drums previously referred to. The strip D may be of different composition from the heated material in the baths of the two receptacles 120 and may pass up between the two drums so that the two drums pick up layers of material and press them against opposite sides of the strip so as to form a multi-layer strip E. The material in the two baths may be maintained in the desired molten condition, and the strip D may be heated before reaching the two drums, by the circulation of a heating medium through passages 123 beneath the two receptacles. The heating medium may be a flame or combustion gases delivered by burners 124 projecting into said passages.

The material delivered from the reel 121 may be steel and the material in the two receptacles 120 may be copper, or tin or two different materials or metals may be employed in the two separate receptacles. The drums 122 may have cylindrical surfaces to apply strips or sheets to the opposite sides of a flat strip or sheet delivered from the reel 121, or they may be grooved to apply a coating to a wire or rod in which case the same material or metal may be employed in both of the receptacles 120, but different from that delivered from the reel 121.

An apparatus somewhat similar to that shown in Fig. 19 may be employed for simultaneously making a two layer sheet or strip without any central core. In Fig. 20 there is employed a pair of receptacles 120 similar to those shown in Fig. 19 and a pair of drums 122 similar to those shown in Fig. 19, but the drums are so positioned that the two layers picked up from the two recepacles are brought together to form a two layer sheet F. In this case it will be understood that two different materials, metals or alloys could be employed in the two receptacles. For instance, one might contain molten steel and the other molten copper, stainless steel, tin, nickel or any other metal or alloy which is to be used with another material or metal to form a two layer strip or sheet, or a combination of any suitable materials which may be joined or united in this manner.

In certain of the constructions previously referred to, the liquid level in the bath is not raised by the action of the vacuum, and the vacuum is employed only for causing the film or layer to adhere to the drum or drums and be carried up and delivered as a solid product. In some cases no vacuum need be used, and the passages serve merely to permit escape of air or other gases into the outer atmosphere.

In other constructions the vacuum may be employed solely to lift the material and without being applied to the surface of any drum, as for instance in Fig. 15, and in other constructions vacuum may be employed both for lifting the liquid level and for causing the material to adhere to the drums, particularly as shown in Figs. 9 and 14.

Various other constructions and various other arrangements may be made within the scope of my invention as the forms illustrated are merely to indicate various ways in which the principle may be applied.

Having thus described my invention, what I claim as new and desire to secure by Letters Patent is:

1. The process of producing formed products directly from heated material, which comprises maintaining heated material, rotating a pair of relatively cool cylindrical members in opposite directions with a portion of the surface of each of said rotating members submerged in said heated material, progressively and continuously forming on the submerged surface of each of said rotating members a layer of plastic or solid material, shaping the layer forming surface of each rotating member so as to define the shape of the layer formed thereon, removing gas and air from between the layer and the surface of each rotating member to cause the layers to cling to said surfaces and to convey each of said layers beyond the limits of said heated material, compressing the two layers between said members so as to form a unitary product, and then delivering the unitary product from said members.

2. The process of producing formed products directly from heated material, which comprises maintaining heated material, arranging a pair of relatively cool cylindrical members in predetermined spaced relation to each other, rotating said cylindrical members in opposite directions with a portion of the surface of each of said rotating members submerged in said heated material, progressively and continuously forming on the submerged surface of each of said rotating members a layer of plastic or solid material, shaping the layer forming surface of each rotating member so as to define the shape of the layer formed thereon, removing gas and air from between the layer and the surface of each rotating member to cause the layers to cling to said surfaces and to convey each of said layers beyond the limits of said heated material, compressing the two layers between said members so as to form a unitary product, then delivering the unitary product from said members, maintaining a substantially constant level for said heated material to provide uniform exposure of the surfaces of the rotating members in said material, arranging the material in a receptacle sealed to atmosphere, and removing heavy particles, settling in the receptacle, from the bottom of the receptacle proper.

3. The process of producing formed products directly from heated material, which comprises maintaining heated material, arranging a pair of relatively cool cylindrical members in predetermined spaced relation to each other, rotating said cylindrical members in opposite directions with a portion of the surface of each of said rotating members submerged in said heated material, removing foreign particles from said rotating members prior to entering the heated material, progressively and continuously forming on the submerged surface of each of said rotating members a layer of plastic or solid material, shaping the layer forming surface of each rotating member so as to define the shape of the layer formed thereon, removing gas and air from between the layer and the surface of each rotating member to cause the layers to cling to said surfaces and to convey each of said layers beyond the limits of said heated material, compressing the layers between said members to form the resulting product, and then delivering said resulting product from said members.

4. The process of producing formed products directly from heated material, which comprises maintaining two different heated materials, arranging a pair of relatively cool cylindrical members in predetermined spaced relation to each other, rotating said members in opposite directions with a portion of the surface of one of said rotating members submerged in one of said heated materials and a portion of the surface of the other rotating member submerged in the other of said heated materials, progressively and continuously forming on the submerged surface of each of said rotating members a layer of plastic or solid material, shaping the layer forming surface of each rotating member so as to define the shape of the layer formed thereon, removing gas and air from between the layer and the surface of each rotating member to cause the layers to cling to said surfaces and to convey each of said layers beyond the limits of said heated materials, compressing the two layers between said members so as to form a unitary product having a different material on each side thereof, and then delivering the unitary product from said members.

5. The process of producing formed products directly from heated material, which comprises maintaining heated material, arranging a pair of relatively cool cylindrical members in predetermined spaced relation to each other, rotating said members in opposite directions with a portion of the surface of each of said rotating members submerged in said heated material, progressively and continuously forming on the submerged surface of each of said rotating members a layer of plastic or solid material, removing gas and air from between the layer and the surface of each rotating member to cause the layers to cling to said surfaces and to convey each of said layers beyond the limits of the heated material, arranging a preheated preformed element between the layers held by said rotating members, compressing said layers onto opposite surfaces of said element in passing between said rotatable members to form a unitary product consisting of said preformed element and said layers, and then delivering said unitary product from said members.

6. The process of producing formed products directly from heated material, which comprises maintaining heated material, moving the surface of a relatively cool member through said heated material to form upon said moving surface a plastic or solid layer of said heated material, removing gas and air from between said moving surface and said layer of plastic or heated material so as to cause said layer to cling to said moving surface and to enable the moving surface to convey the layer beyond the limits of the heated material, and to deliver said layer free of the moving surface.

AARON SIMONS.